(12) United States Patent
Grimm et al.

(10) Patent No.: US 10,521,736 B2
(45) Date of Patent: Dec. 31, 2019

(54) RIDE SHARING ACCESSORY DEVICE AND SYSTEM

(71) Applicant: GM GLOBAL TECHNOLOGY OPERATIONS LLC, Detroit, MI (US)

(72) Inventors: Donald K. Grimm, Utica, MI (US); Paul H. Pebbles, Novi, MI (US); Robert P. Miles, Austin, TX (US); Ramie Phillips, III, Rochester Hills, MI (US); Travis J. Ryan, Austin, TX (US); Xi Ju, Troy, MI (US); Pavan K. Namineni, Ann Arbor, MI (US); Christopher L. Oesterling, Troy, MI (US)

(73) Assignee: GM Glboal Technology Operations LLC, Detroit, MI (US)

( * ) Notice: Subject to any disclaimer, the term of this patent is extended or adjusted under 35 U.S.C. 154(b) by 529 days.

(21) Appl. No.: 15/291,378

(22) Filed: Oct. 12, 2016

(65) Prior Publication Data

US 2017/0178035 A1    Jun. 22, 2017

Related U.S. Application Data

(60) Provisional application No. 62/270,798, filed on Dec. 22, 2015.

(51) Int. Cl.
*G06Q 10/02* (2012.01)
*G06Q 30/06* (2012.01)
(Continued)

(52) U.S. Cl.
CPC ........... *G06Q 10/02* (2013.01); *B60R 25/241* (2013.01); *G06Q 30/0645* (2013.01);
(Continued)

(58) Field of Classification Search
CPC .... G06Q 10/02; G06Q 20/30; G06Q 20/3224; G06Q 30/0601; G06Q 2240/00;
(Continued)

(56) References Cited

U.S. PATENT DOCUMENTS

| 2008/0117079 A1* | 5/2008 | Hassan | ................ B60R 25/045 340/901 |
| 2010/0159846 A1* | 6/2010 | Witkowski | ......... G07C 9/00857 455/70 |

(Continued)

FOREIGN PATENT DOCUMENTS

| CN | 201876939 U | 6/2011 |
| CN | 103810629 A | 5/2014 |

(Continued)

OTHER PUBLICATIONS

Juhani Latvakoski, Mandi Ben Alaya, Herve Ganem, Bashar Jubeh, Antti Iivari, Jeremie Leguay, Jaume Martin Bosch, and Niclas Granqvist; "Towards Horizontal Architecture for Autonomic M2M Service Networks"; 2014 (Year: 2014).*

*Primary Examiner* — Rupangini Singh
*Assistant Examiner* — Dione N. Simpson
(74) *Attorney, Agent, or Firm* — Quinn IP Law

(57) ABSTRACT

A method of authorizing access and operation for vehicle sharing via a portable device. A request reservation is generated to reserve a vehicle via a portable device carried by a user. The reservation includes a portable device identifier and reservation details. Authentication keys are transmitted to the portable device and a plug-in device coupled to the vehicle in response to a successful authorization. The plug-in device is used to perform vehicle access and vehicle operations of the vehicle. The authentication keys enable the portable device and the plug-in device to be paired for enabling vehicle access and operations. An authorization is executed between the portable device carried by a user and (Continued)

a plug-in device coupled to the vehicle. Access to the vehicle operations are enabled in response to a successful authorization.

20 Claims, 8 Drawing Sheets

(51) Int. Cl.
*B60R 25/24* (2013.01)
*H04L 9/32* (2006.01)
*H04W 12/04* (2009.01)
*H04W 12/06* (2009.01)
*H04W 12/08* (2009.01)
*G07C 9/00* (2006.01)
*H04W 4/12* (2009.01)
*H04W 84/18* (2009.01)
*H04W 88/02* (2009.01)

(52) U.S. Cl.
CPC ........... *H04L 9/3213* (2013.01); *H04W 12/04* (2013.01); *H04W 12/06* (2013.01); *H04W 12/08* (2013.01); *G06F 2221/0771* (2013.01); *G07C 9/00174* (2013.01); *H04W 4/12* (2013.01); *H04W 84/18* (2013.01); *H04W 88/02* (2013.01)

(58) Field of Classification Search
CPC .... G08G 5/006; G08G 5/0069; B64C 39/024; B64C 2201/127; H04W 4/021; G01S 19/42
USPC ............................................................ 705/5
See application file for complete search history.

(56) References Cited

U.S. PATENT DOCUMENTS

| | | | | |
|---|---|---|---|---|
| 2011/0112969 | A1* | 5/2011 | Zaid | G06Q 10/02 705/50 |
| 2013/0099892 | A1* | 4/2013 | Tucker | G07C 9/00309 340/5.61 |
| 2013/0317693 | A1* | 11/2013 | Jefferies | G07B 15/00 701/31.5 |
| 2015/0341766 | A1* | 11/2015 | Nelson | H04W 4/025 455/404.2 |
| 2015/0356797 | A1* | 12/2015 | McBride | G07C 9/00119 340/5.61 |
| 2016/0099927 | A1* | 4/2016 | Oz | H04L 63/08 726/9 |
| 2017/0174178 | A1* | 6/2017 | Nixon | B60R 25/10 |

FOREIGN PATENT DOCUMENTS

| | | |
|---|---|---|
| CN | 104282088 A | 1/2015 |
| CN | 204279354 U | 4/2015 |
| CN | 104648319 A | 5/2015 |
| CN | 104980274 A | 10/2015 |
| CN | 104980602 A | 10/2015 |
| CN | 105046829 A | 11/2015 |
| CN | 105083214 A | 11/2015 |
| CN | 105083218 A | 11/2015 |
| DE | 102012009019 A1 | 11/2013 |

* cited by examiner

RIDE SHARING ACCESSORY DEVICE AND SYSTEM

CROSS-REFERENCE TO RELATED APPLICATIONS

This application claims priority of U.S. Provisional Application Ser. No. 62/270,798 filed Dec. 22, 2015, the disclosure of which is incorporated by reference.

BACKGROUND OF INVENTION

An embodiment relates to vehicle sharing.

Renting a vehicle typically requires that a reservation be made with a rental company and that the user travels to the site of the rental company to obtain keys to access to the vehicle as well as enabling vehicle operations. Modern vehicles typically offer remote keyless (i.e., keyfobs that can wirelessly access vehicle functions and utilize a physical key that is inserted into an ignition switch to start the vehicle) or passive entry/start systems (i.e., push-button start) where the keyfob can authorize starting functions as long as it is detected inside the vehicle. With such systems, the assigned user is not known until the user checks in at the on-site rental facility, selects the vehicle and is issued keys. Typically, going to the rental site may be time consuming in having to travel to the rental site which may not be in close proximity to the user and then obtain the key fob from the rental site for accessing the vehicle. As a result, rental vehicles used for vehicle sharing operations are parked at a centralized facility and secured until the user obtains the fob or paperwork to utilize the vehicle even though a vehicle reservation has been made.

In summary, for vehicle ride sharing entities, the issue is the user gaining both authorization and access to utilize the vehicle without having to go to the rental agency site and receive approval from one or more company personnel before leaving with the vehicle.

SUMMARY OF INVENTION

An advantage of an embodiment is the direct communication between a user and a service provider for providing a car share vehicle where the user is able to obtain authentication tokens from a remote entity and then autonomously authenticate the smart device to the vehicle based on user-initiated actions or upon approach of the vehicle. The system provides a plug-in device that is easily adaptable to any vehicle utilizing an OBD (on-board diagnostics) connection or by directly wiring into the vehicle. The plug-in device is initially paired with the vehicle to enable remote keyless functions such as unlock, lock, sound horn or remote start. The plug-in device can also communicate with a user's smart phone utilizing communication capabilities onboard the accessory device (e.g., BLE/Bluetooth 4.0/BluetoothSMART, WiFi or other similar communication technologies) in order to authenticate the smart phone and allowing the smart phone to gain access to the vehicle for operating the vehicle when the smart phone is within a proximal distance of the vehicle and within the approved time period. The routine provides for a user to reserve a vehicle at a respective location that does not require that the vehicle be located at a designated rental site. Rather, the user may reserve a vehicle parked in a location that is in proximity to the user's location. The smart phone can communicate with the remote entity for issuing authentication tokens (i.e., a digital key) to the smart phone and via proxy to the plug-in device based on a registration process. Secure delivery of the tokens will be made to both the plug-in device and the smart phone. When the user approaches the vehicle, the smart phone app may be invoked on-demand, or alternatively, the phone app may autonomously communicate with the plug-in device in the vehicle and provides the necessary authentication token which can be authenticated by the plug-in device for allowing the user to access and operate the vehicle via the smart phone.

An embodiment contemplates a method of authorizing access and operation for vehicle sharing via a portable device. A request reservation is generated to reserve a vehicle via a portable device carried by a user. The reservation includes a portable device identifier and reservation details. Authentication keys are transmitted to the portable device and a plug-in device coupled to the vehicle in response to a successful authorization. The plug-in device is used to perform vehicle access and vehicle operations of the vehicle. The authentication keys enable the portable device and the plug-in device to be paired for enabling vehicle access and operations. An authorization is executed between the portable device carried by a user and a plug-in device coupled to the vehicle. Access to the vehicle operations are enabled in response to a successful authorization.

DETAILED DESCRIPTION

Figure 1:
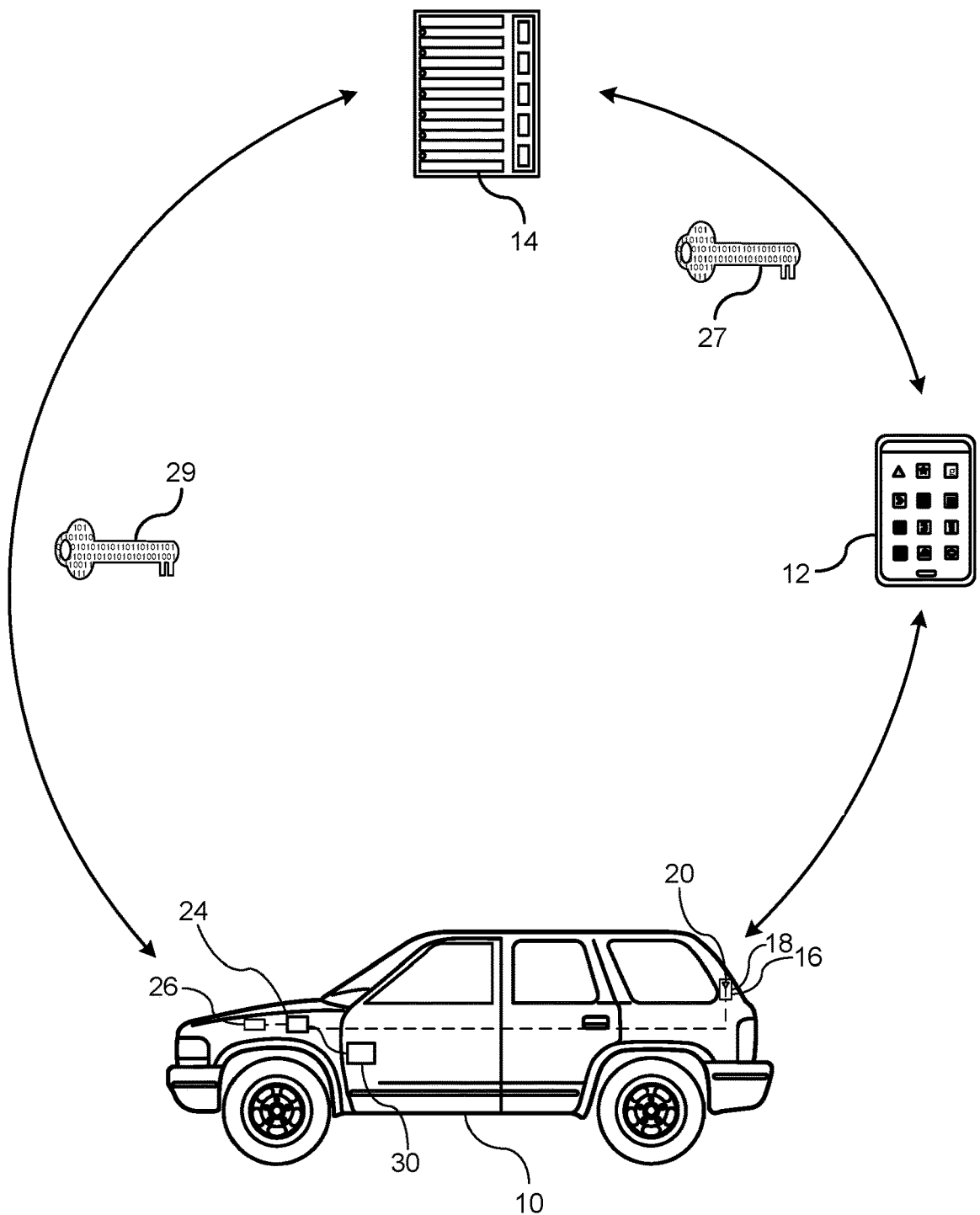
FIG. 1 illustrates a communication flow diagram between communicating entities for a vehicle sharing system.

FIG. 1 illustrates communication flow diagram between communicating entities for a vehicle sharing system. The vehicle sharing system utilizes an adaptive plug-in device that assists in authenticating a user portable device to a vehicle for enabling vehicle operations. The vehicle sharing system allows a user to reserve a respective vehicle parked by a previous user at a respective location utilizing a portable device, such a smart phone. The vehicle sharing system pairs the user's portable device to the plug-in device so that vehicle functions, such as vehicle access and operation, may performed by the user on a smart phone without having the actual key or a fob to perform the vehicle operations. It should be understood that although an automobile is used herein for exemplary purposes, the embodiments described herein can be applied to other types of systems where share access is utilizes including, but are not limited to, rail systems, planes, off-road sport vehicles, robotic vehicles, motorcycles, farm equipment, and construction equipment.

FIG. 1 illustrates a vehicle 10, a portable wireless communication device 12, and a remote entity 14. The portable wireless communication device 12 may include a smart phone, tablet, or similar that is capable of communicating with the vehicle 10 and the remote entity 14. For the illustrative purposes described herein, the smart phone 12 will be used herein, however it should be understood that the embodiments described herein are not limited to a smart phone.

The vehicle 10 is equipped with plug-in device 16 that includes a wireless communication module including, but not limited to, a Bluetooth low energy (BLE) module 18, all of which is referred to as an accessory device. The plug-in device 16 as defined herein is a central processing unit that including vehicle FOB functionality that can either be plugged into an existing service communication port of the vehicle or may be permanently installed as part of the vehicle architecture. The accessory device would include a Bluetooth chipset and single antenna 20. It should be understood that the accessory module can be constructed as a plurality of single PCBs (e.g., plug-in module and the BLE module) or can be a single PCB where the plug-in module and BLE module are on the same PCB and communicably connected through traces.

The vehicle 10 further includes a body control module (BCM) 24, a vehicle communication platform (VCP) 26.

The BCM 24 includes various vehicle functionality including, but not limited to, lock and unlock functionality, trunk or tailgate release, sound horn, remote start and engine start/stop functionality during typical communications with RKE or passive systems.

The vehicle communication platform (VCP) 26 enables long distance communication from the accessory device to the remote entity 14. The VCP 26 may provide a WiFi hotspot that is accessible by the accessory device as a communication medium that can be used to provide the accessory device with an additional authentication mechanism (i.e., the accessory device may check for authentication agreement between what was provided by the smartphone and what is provided by the remote entity). Alternatively, the accessory device may include its own long range communication capabilities.

The plug-in device 16 is an adaptive device that is selectively coupled to an on-board diagnostic (OBD) port 30. Alternatively, the plug-in device 16 is an adaptive module that can be coupled and decoupled from the OBD 30 or can be permanent hardware installed during manufacturing of the vehicle or as part of an aftermarket installation; however, since vehicles may be used only temporarily for vehicle sharing, the adaptive plug-in device 16 allows the vehicle 10 to be easily connected to convert the vehicle for use in the vehicle sharing system and then can easily be disconnected when the vehicle 10 is no longer utilized for vehicle sharing. If temporarily coupled to the vehicle, a Y-connector may be used where a base of the Y-connector couples to the OBD port, and one of the branches of the Y-split couples to the accessory device. The other branch or the Y-split includes an open OBD connector that is used by service personnel to access the vehicle OBD system. Alternatively, the device can remain securely installed inside the vehicle and the administrator can selectively enable vehicle availability based on preference. The accessory device concept enables fleet operators or ride share operators to quickly and easily instrument large populations of existing vehicle with ride share capabilities. The accessory device includes security mechanisms that protect against unauthorized usage or theft via built in mechanisms that disable remote keyless functions unless an authorization is received (i.e., the remote keyless electronics of the hardware are not powered unless a valid token has been received from a connecting phone and/or remote server entity) The plug-in device 16 replaces the functionality of storing an authorization key as is done by a physical fob carried by the user when passive entry, passive lock, and passive engine start operations are performed. Generating the passive commands can be performed utilizing a plug-in device 16 which will acquire the necessary keys as described herein for enabling and executing vehicle operations. To obtain the authorization keys, the remote entity 14 issues the public keys 27 and 29 to both the portable device 12 and optionally to the plug-in device 16. Alternatively, other schemes in addition to public key cryptography may be utilized. When the user approaches the vehicle 10 with the smart phone 12, the phone sends to the accessory module a secure package that can be validated as originating from both the remote entity and the phone (i.e., the key and command request information are digitally signed. In this embodiment of utilizing the public keys, the token that originates from the smart phone includes two layers of encapsulated information. An outer layer of the token is the "command request" (e.g., lock, unlock, etc.) and is signed by the smart phone's public key. An inner layer of the token is the "digital key" and includes a unmodified server-signed object, which provides a cleartext package of the allowed operations, constraints (allowed time frames etc) and the smart phones public certificate\key and other server information. The public key that is installed onto the device can be used so that the entire package (e.g., the digital key from the remote server and the command request from the phone) can be validated such that each has originated from the true party. The plug-in device 16 and the smart phone 12 can authenticate one another for vehicle access and operation.

The advantage of a plug-in device 16 is that any vehicle selected for vehicle sharing may be easily be converted to incorporate the plug-in device 16, and may be easily removed when the vehicle is no longer utilized in vehicle sharing, or at the very least deactivated. The plug-in device 16 coupled to the OBD 30 allows communication with the body control module (BCM) 30 (via the onboard remote keyless chipset) and other modules of the vehicle. The BCM 30 is operable to control the lock and unlock vehicle doors including a trunk or tailgate release, start-up and turn off an engine as well as other vehicle functions after authorized requests are received by the plug-in device 16 and transmitted via on the onboard remote keyless device). As a result, a fob typically carried by the user is not required for passive vehicle operation and engine start, and that any person may be provided access to the shared vehicle through a registration and authorization process utilizing their smart phone device 12 (e.g., smart phone).

Figure 2:
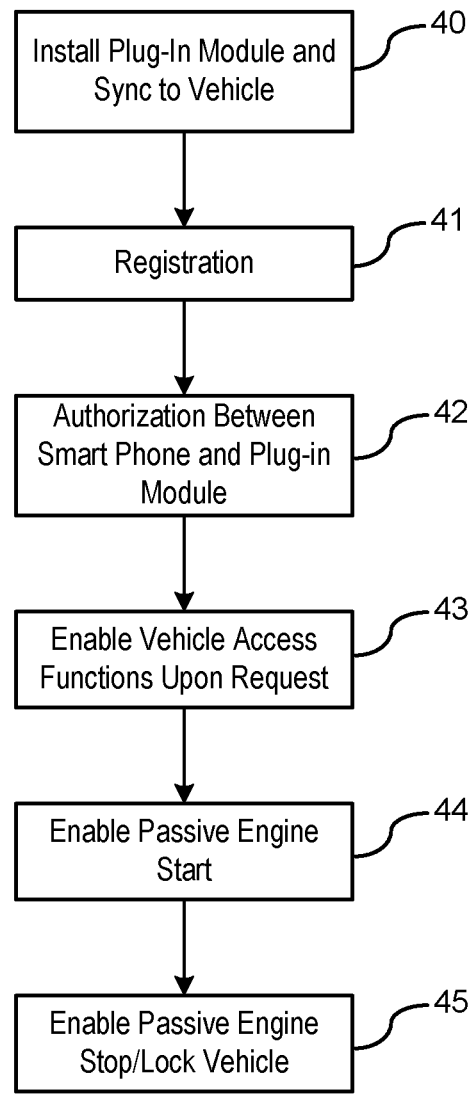
FIG. 2 is a broad overview flowchart for reserving and authorizing use of the vehicle.

FIG. 2 is a broad overview of the process for reserving and authorizing use of the vehicle equipped for vehicle sharing.

In step 40, as an initial setup, a plug-in device is added (i.e., paired as an additional keyfob) to the vehicle. The plug-in device includes a remote keyless component that can be used to perform vehicle access and start functions.

In step 41, registration is performed for a user to reserve a vehicle currently located at a respective parking location utilizing CarShare App on the smart phone. The vehicle may be parked at any location and may be located by a user through GPS/Navigation. For example, a user's phone GPS may be used to include available cars nearby. The user via smart phone creates a registration for a respective vehicle by providing various details including device identification, user name, and reservation details.

In step 42, authorization of the user is executed between the smart phone of the user and the plug-in device.

In step 43, upon a successful authorization, FOB functions such as lock, unlock, and passive start are enabled based on requests from the smart phone to the plug-in device.

In step 44, passive start is enabled based on a successful sensing of the smart phone in the vehicle and the user actuating a push start/stop button. Remote start may be performed when the user is exterior of the vehicle during the authorization stage where the smart phone communicates with the remote entity to actuate the remote start as opposed to the sensing the smart phone within a close proximity to the vehicle and actuating the start button.

In step 45, upon completion of the trip, the vehicle is turned off and the vehicle is secured and the authorization keys are wiped clean so that the vehicle cannot be utilized without issuing new authorization keys.

Figure 3:
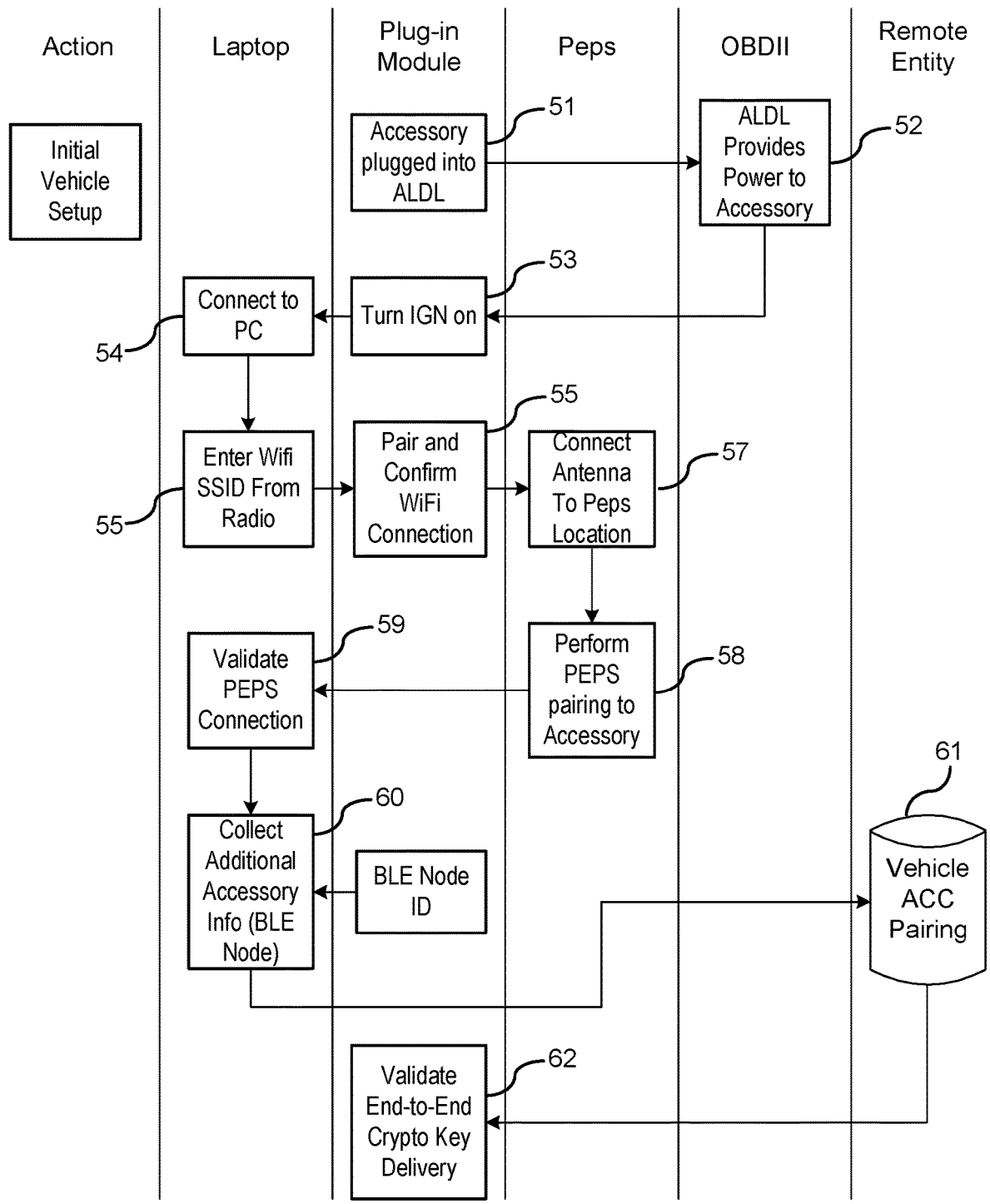
FIG. 3 is a flow diagram for initial setup of a plug-in device.

FIG. 3 represents a flow diagram for an initial setup of the plug-in device in the vehicle as described earlier in step 40. Upon installing the accessory device in the vehicle, the accessory device must be paired with the vehicle as an additional remote keyless device. In step 51, the vehicle setup is initiated and the accessory device is connected to the OBD, Assembly Line Diagnostic link (ALDL), or similar.

In step 52, the OBD provides power to the accessory device. In step 53, ignition is turned on.

In step 54, if the accessory device will utilize communications provided by an in-vehicle WiFi hotspot, a communication link of the vehicle is coupled to a personal computer such as a laptop or similar for establishing a communication between the accessory device and the laptop.

In step 55, a Wi-Fi service set identifier (SSID) may be entered into the accessory device to provide it with Internet access via the built-in vehicle hotspot. The SSID is a sequence of characters that uniquely names a wireless local area network (WLAN).

In step 56, the accessory device is paired with the WiFi and the connection with the WiFi hotspot is confirmed as part of the installation procedure.

In step 57, a respective BLE antenna is connected to the PEPS location. In step 58, PEPS is paired to the accessory device. In this step, the accessory device gets added as an additional fob to the vehicle. For example, a respective vehicle may allow you to add up to 8 keyfobs that are recognized by the vehicle and a pairing process is performed by a customer or other personnel such as a service technician. As a result, the accessory device will be added as an additional fob.

In step 59, a valid PEPS connection to the laptop is validated. This step validates that the fob was successfully paired and is functional. In step 60, additional BLE module information such as the BLE node ID is collected from the BLE module and is provided to the laptop for fleet management purposes.

In step 61, the remote entity is contacted to provide keys to perform cryptography validation by pairing the vehicle and the accessory device via the remote entity.

In step 62, end-to-end cryptography key delivery from the remote entity to the accessory device is validated. As a result, the accessory device is paired with the vehicle and can access PEPS functionality for ongoing communication between the respective devices of the vehicle.

Figure 4:
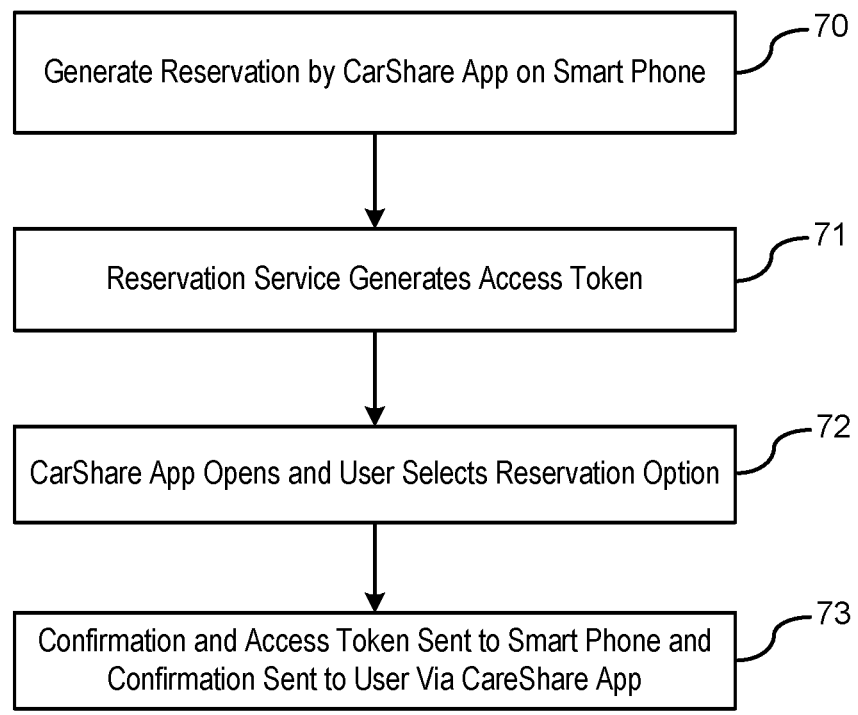
FIG. 4 is a flow diagram for reservation of a vehicle.

FIG. 4 represents a flow diagram for reservation by a user utilizing the smart phone as described earlier in step 41.

In step 70, the user utilizing a CarShare App creates a reservation. The registration includes, but is not limited to, a device ID (e.g., smart phone identifier), username, and reservation details.

In step 71, the remote entity or reservation service generates a signed access token for the registration. The access token is transmitted to the smart phone via the CarShare App within a predetermined period of time from the registration request. The signed access token may include a BLE universal unique identifier (UUID), time range, and timestamp.

In step 72, the CarShare App opens and the user selects the start reservation option.

In step 73, a confirmation and Access token is sent to the smart phone and the confirmation is sent to the user via the CarShare App.

Figure 5:
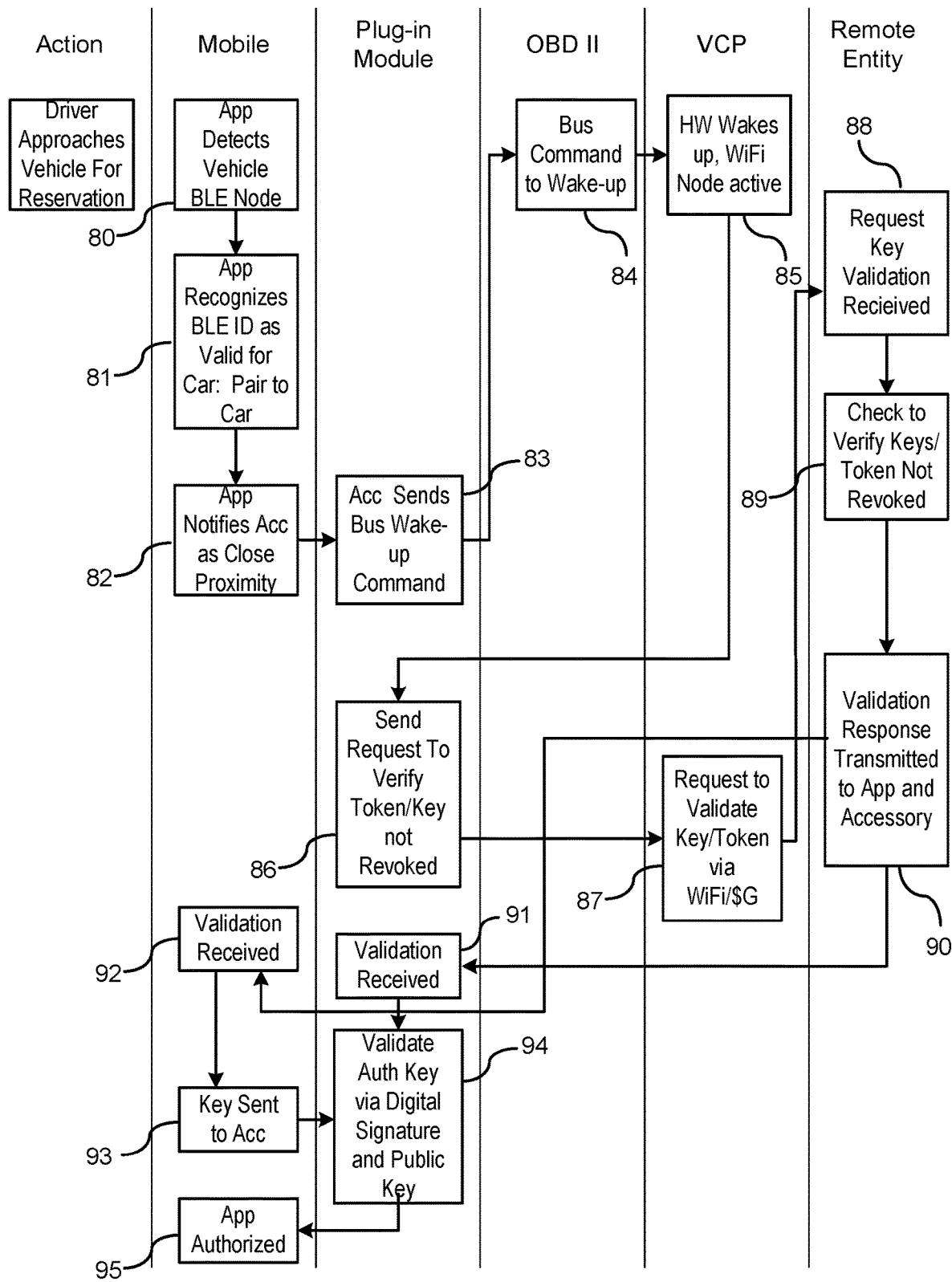
FIG. 5 is a flow diagram for detection and authorization of a user based on an approaching smart phone.

FIG. 5 represents a detection and authorization of the user based on the approaching smart phone. In step 80, in response to user input request or a driver approaching the vehicle with the registered smart phone, the CarShare App detects the vehicle BLE node by a BLE broadcast. The BLE module periodically wakes up and broadcasts a challenge signal for listening devices.

In step 81, the CarShare App recognizes the received BLE ID as a valid identification for the car. The CarShare App pairs a smart phone to the vehicle.

In step 82, the CarShare App notifies the BLE module that the user is in close proximity to the vehicle.

In step 83, in response to the application notifying the BLE module as to the proximity of the user, the BLE module may send a BUS wake-up call to components on the BUS if the WiFi connection will also be used as part of authentication. In step 84, the OBD transmits the wake-up command to the VCP hardware.

In step 85, the VCP hardware wakes up and activates a Wi-Fi node.

In step 86, the accessory module communicates using the Wi-Fi mode. A request to ensure that the token has not been revoked is transmitted from the accessory device via Wi-Fi (or similar network such as a 4G network) to the remote entity. Alternatively if this communication path is not available, than a check can further be performed by the carshare app in the mobile device. In step 87, the request to validate the key or web token is transmitted by the VCP via the Wi-Fi/4G network.

In step 88, the request for key validation is received by the remote entity, and keys\token are checked to ensure that they have not been revoked by the remote entity in step 89.

In step 90, validation response is transmitted to the CarShare App on the smart phone and\or to the accessory device via the BLE module.

In step 91, the authorization key validation is received by the accessory device. In addition, in step 92, the authorization key validation is received by the smart phone.

In step 93, the authorization key received by the smart phone is transmitted to the accessory device via the BLE module.

In step 94, the accessory device validates the authorization key received by the smart phone using the digital signature and the public key of the remote entity.

In step 95, a communication is sent to the smart phone to authorizing the CarShare App use with the accessory device of the vehicle.

Figure 6:
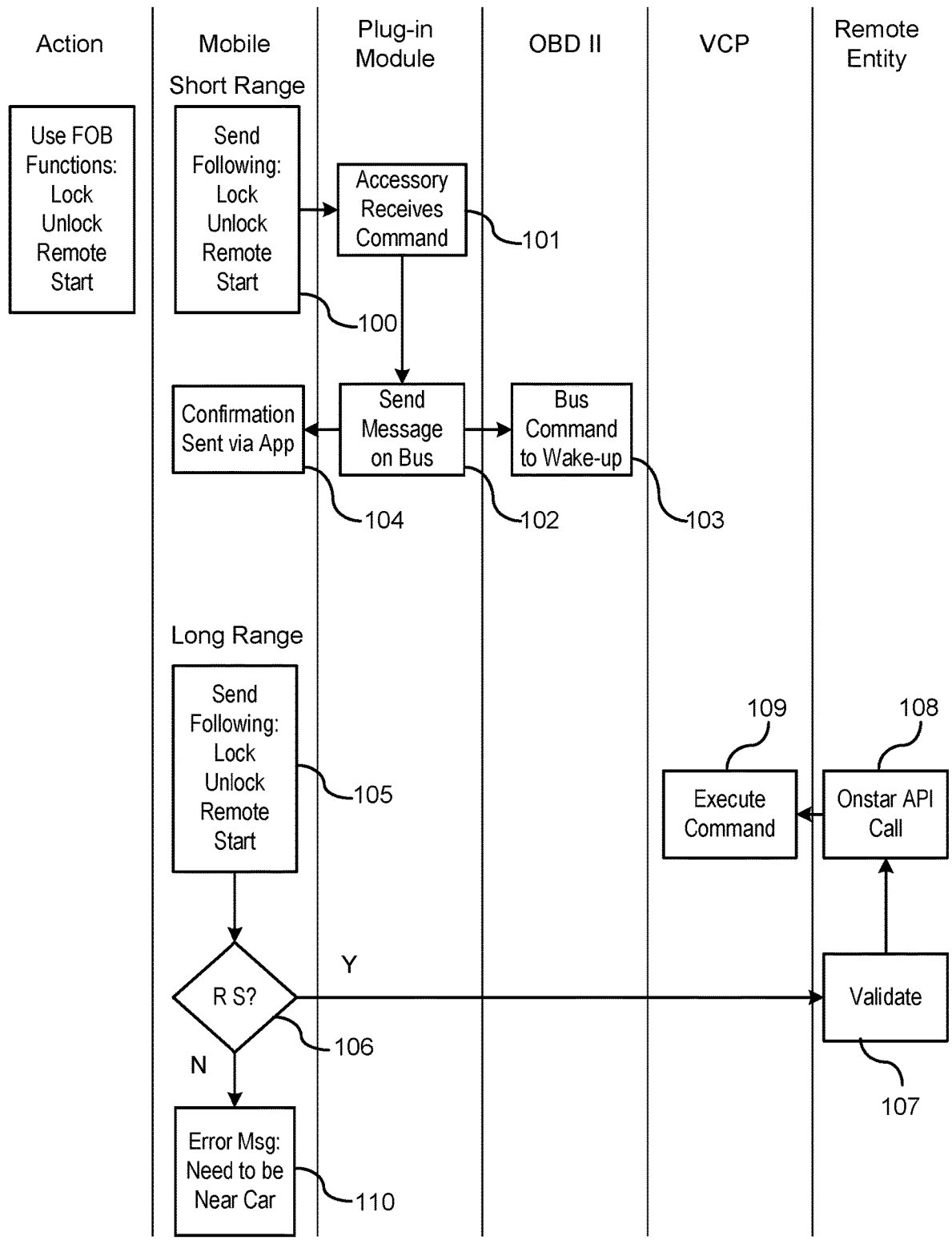
FIG. 6 is a flow diagram for executing vehicle functions via the smart phone.

FIG. 6 is a flow diagram for executing vehicle functions typically executed by a FOB of a vehicle as described earlier in step 43. The following steps recite short range communication between the smart phone and the vehicle.

In step 100, a respective vehicle FOB command (e.g., lock, unlock, remote start) is selected on the CarShare App of the smart phone by the user for executing the selected vehicle function.

In step 101, the requested command is transmitted wirelessly and received by the BLE module of the accessory device via the BLE antenna.

In step 102, the accessory device cues a wake-up message to be transmitted on the communication bus, which is a direct form of communication. This step is only required when the accessory device does not have a keyfob PCB that would either be added on or built-in to the main board of the accessory. If the accessory device does include a remote keyless interface, then an indirect form of communication is utilized where the accessory device commands can be sent to the fob PCB, which are then executed by the vehicle. This would utilize a PEPS module of the vehicle coupled to the BCM which is the executor of the commands. In yet another embodiment, a secure check can be utilized with either the direct or indirect form of communication as set forth above where the accessory device also wakes up the WiFi hotspot to communicate with the remote entity directly to retrieve and compare remote entity data with phone data and check for agreement before executing any commands.

In step 103, a wake-up command is transmitted on the communication bus to the OBD to execute the commands such as lock, unlock, sound horn, and remote start.

In addition, in step 104, a confirmation message is sent to the smart phone and received via the CarShare App indicating that the request has been executed.

Steps 105-110 represent a flow diagram when long range communications are required. In some instances, requests to perform a vehicle operation may occur when driver requires execution of a vehicle function prior to the user reaching the vehicle such as remote start for heating or cooling the vehicle.

In step 105, a respective vehicle FOB command (e.g., lock, unlock, remote start) is selected on the CarShare App of the smart phone for executing the selected vehicle function.

In step 106, a determination is made whether the requested command is a remote start. If the requested command is a remote start, the vehicle advances to step 107; otherwise, the routine proceeds to step 110.

In step 107, in response to a remote start request, the remote entity validates the request for remote start. In step 108, the remote entity contacts a call center that is capable of accessing control over certain functions of the vehicle. Such systems are typically controlled by an OEM manufacturer of the vehicle and offer its services through a subscription based service. This service is capable of monitoring navigation instructions to the vehicle, monitoring operating conditions (e.g., state-of-health) of the vehicle, and remotely accessing certain functions of the vehicle (lock, unlock, remote start functionality), the call center is notified by the remote entity of the requested command.

In step 109, the call center remotely executes the requested command to remotely start the vehicle while the vehicle is locked.

In step 110, in response the requested command being other than the remote start, such as a door unlock request or trunk release or sound horn, due the proximity of the user to the vehicle, an error message may be displayed on the CarShare App that the user needs to be closer to the vehicle to execute these respective functions for security purposes.

Figure 7:
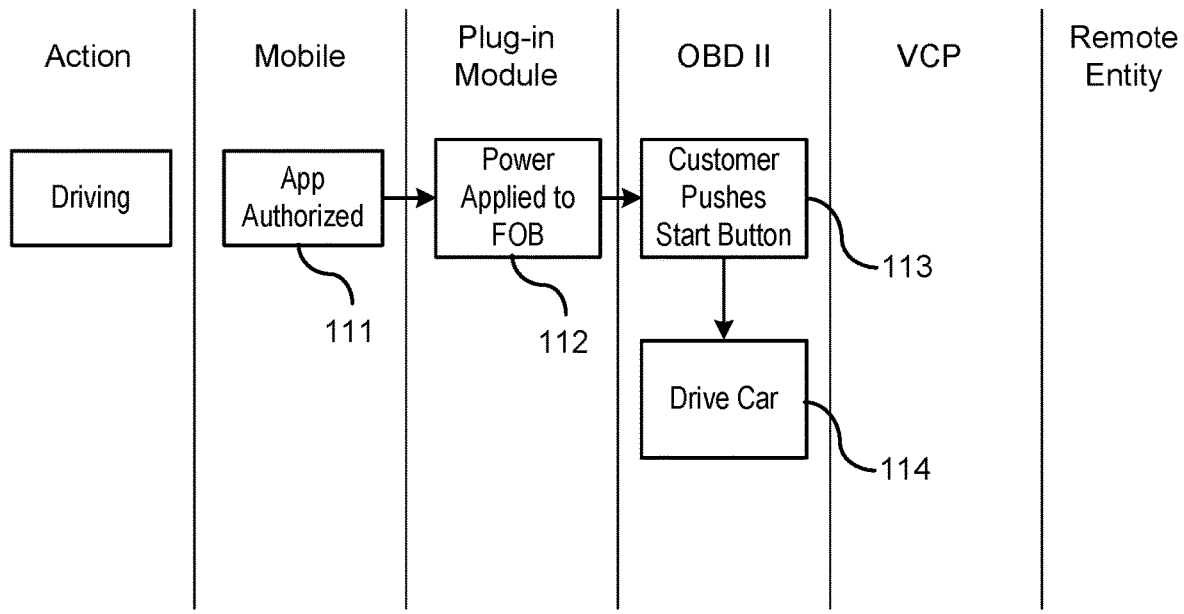
FIG. 7 is a flow diagram for executing driving functions of the vehicle.

FIG. 7 is a flow diagram for executing driving functions of the vehicle based on authentication between the accessory device and the smart phone.

In step 111, the CarShare App is authorized for driving the vehicle. Once the user is within the interior of the vehicle, BLE module of the accessory detects the smart phone within the interior of the vehicle via the BLE interior antenna.

In step 112, power is applied to the accessory device which stores the authorization keys for enabling vehicle start functions.

In step 113, a customer pushes a start button of the vehicle for turning on the ignition. PEPS functionality is executed by authorizing engine access as would be performed during a typical PEPS operation.

In step 114, the engine is turned on and the user is allowed to drive the vehicle.

Figure 8:
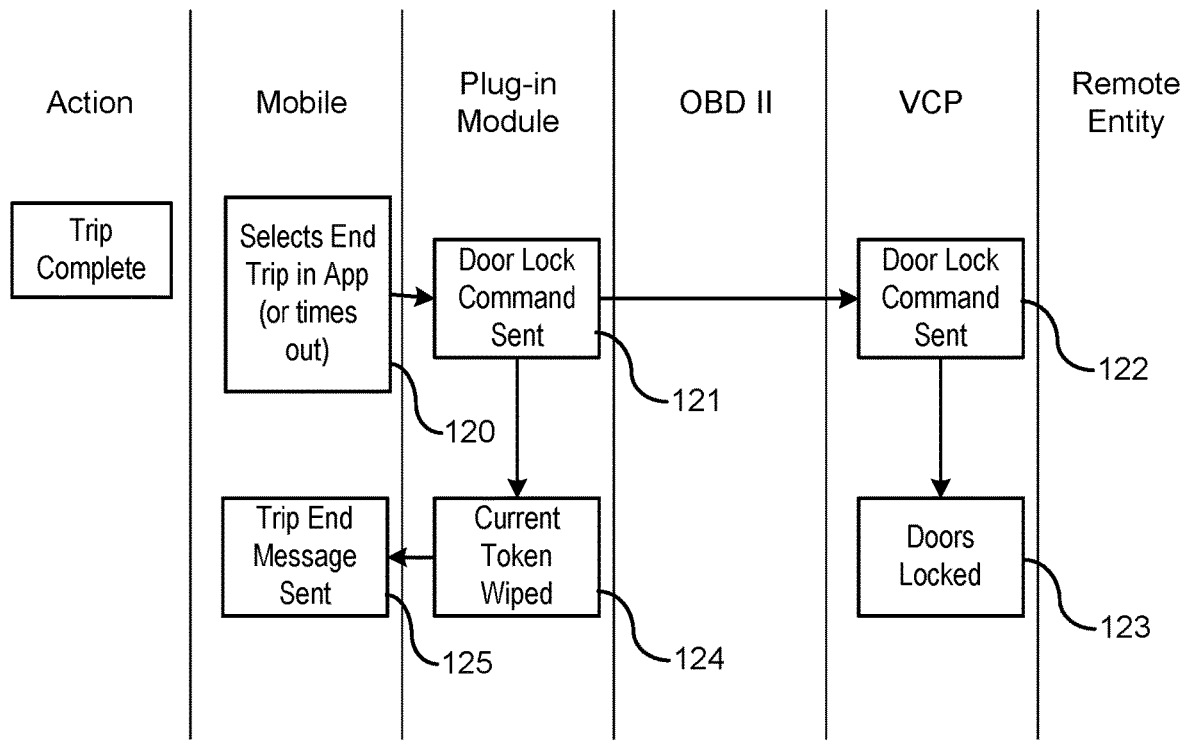
FIG. 8 is a flow diagram for securing the vehicle upon a completed trip.

FIG. 8 represents a flowchart for securing the vehicle after the user exits the vehicle.

In step 120, in response to the user completing the trip, the user selects "end trip" in the CarShare App or the time out occurs. Alternatively, for security purposes, the system may sense when BLE communication is lost with the portable device. In such a situation, an assumption is made that the user has walked away from the vehicle which may trigger the following steps so access and operation by someone attempting to steal the care shortly thereafter may be prevented.

In step 121, a door lock command is transmitted by the built-in module requesting a door lock command. In step 122, the door lock command is transmitted via the OBD.

In step 123, the vehicle doors are locked.

In step 124, in response to the door lock command being transmitted by the accessory device, the current authorization key is wiped from the memory of the accessory device.

In step 125, a trip end message is displayed on CarShare App of the smart phone. Messages may be displayed on vehicle displays for start/end of trip which can be accessed via the accessory device.

Figure 9:
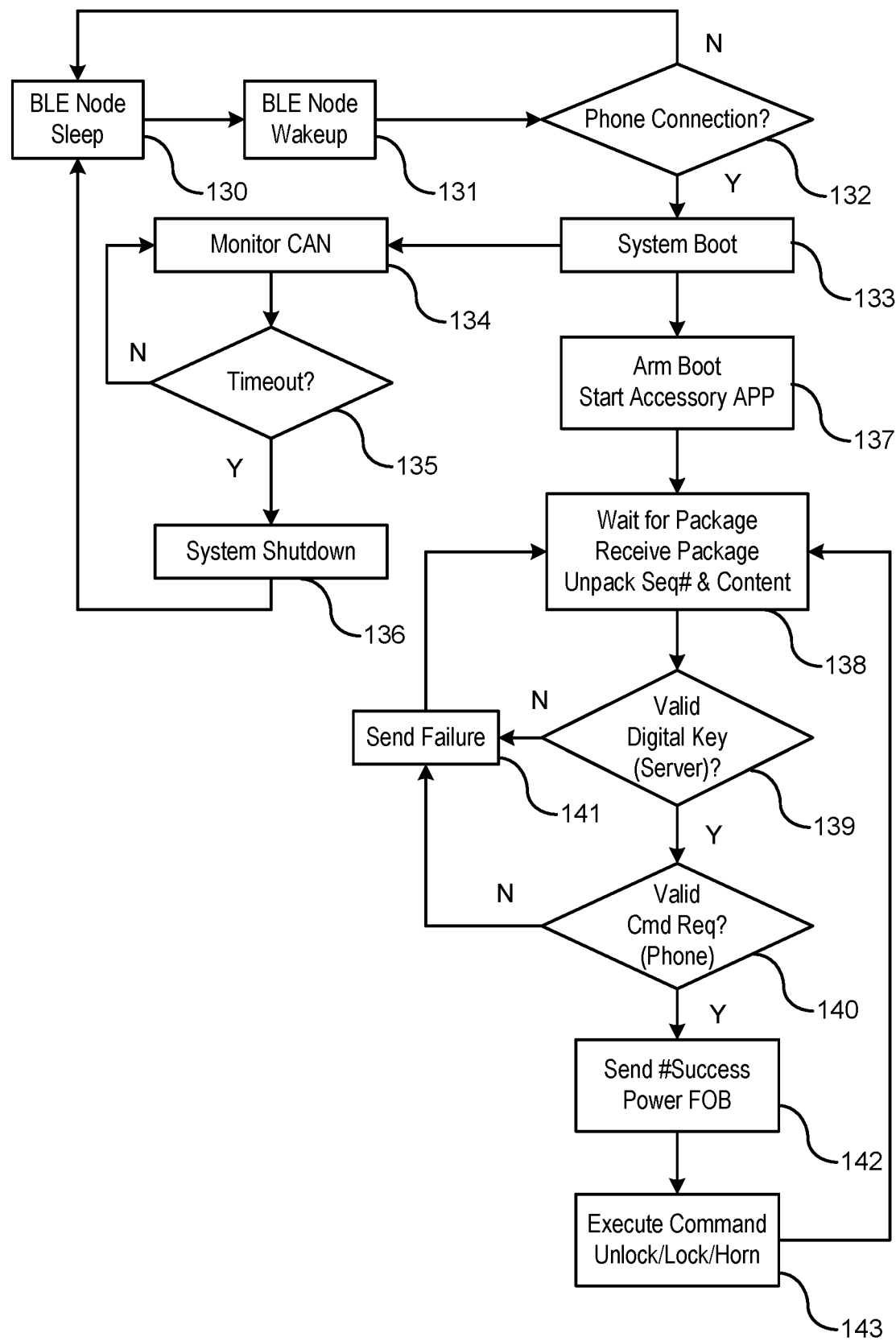
FIG. 9 is a flowchart for executing vehicle command functionality between the smart phone and the plug-in device.

FIG. 9 is a flowchart for a software diagram for executing vehicle command functionality between the smart phone and the plug-in device.

In block 130, the BLE module is in sleep mode. During sleep mode, the BLE module conserves power such that no signals are broadcast from the BLE module.

In block 131, the BLE module awakens to detect a nearby device attempting to communicate with the BLE module.

In block 132, a determination is made whether the smart phone connection is present. If the determination is made that the phone connection is not present, then the routine returns to step 130 and the BLE module enters sleep mode. If the determination is made that a phone connection is present, then routine proceeds to step 133.

In step 133, a system boot (e.g., a dedicated microcontroller such as a Freescale S12) is initiated where power is allocated to a respective antenna for monitoring respective communications.

In the flowchart as shown, two respective paths are taken. A first path is directed to step 134 where the CAN is monitored for communication. In step 135, a determination is made whether a timeout is present. The time out occurs if no communication is present on the CAN after a predetermined amount of time. If the determination is made that no communication is present on the CAN, then the routine performs a system shutdown in step 136 and the BLE module returns to sleep mode. If the determination is made that the communication is present on the CAN, then the routine continuously loops between step 134 and 135 verifying the communication is ongoing on the CAN.

The second path proceeds to step 137 where processors within respective modules (e.g., accessory device host processor, optionally bus wakeup commands sent to wake up the body control module and VCP vehicle modules) are energized. Communications may be sent to a remote entity to request authentication keys if desired. The authentication keys are sent by the remote entity to both the smart phone and optionally the accessory device. Keys may be sent using a JSON Web Token format.

In step 138, the accessory device waits for a package provided by the smart phone that includes an authorization key. When the package is received, the contents of the package are unpacked.

In step 139, a determination is made as to whether a valid authorization key is provided by the smart phone. If the determination is made that a valid authorization key is provided, then the routine proceeds to step 140; otherwise, routine proceeds to step 141. In step 141, a failure message is sent to the smart phone and a return is made to step 138 to await a next package transmitted by the smart phone.

In step 140, a determination is made whether a valid command request is received by the smart phone. If the valid request is received by the smart phone, then the routine proceeds to step 142; otherwise, the routine proceeds to step 141 where a failure message is sent to the smart phone.

In step 142, a confirmation is sent to the smart phone that the request is successfully received and authorized. The accessory device communicates via remote keyless module to the BCM to power up the respective functions.

In step 143, the BCM module executes the requested command (e.g., lock door, unlock door, horn, release trunk).

While certain embodiments of the present invention have been described in detail, those familiar with the art to which this invention relates will recognize various alternative designs and embodiments for practicing the invention as defined by the following claims.

What is claimed is:

1. A method of authorizing access and operation for vehicle sharing via a portable device comprising:
   generating a request reservation to reserve a vehicle via a portable device carried by a user, the request reservation including a portable device identifier and reservation details, wherein generating the request reservation includes:
     communicating the request reservation to a remote entity by the portable device,
     generating a signed access token by the remote entity, wherein the signed access key includes a cleartext package of allowed operations, constraints, and the portable device identifier, the cleartext package is not readable by the portable device, and
     transmitting the signed access token to the portable device within a predetermined time from the reservation request;
   transmitting authentication keys to the portable device and a plug-in device coupled to the vehicle in response to a successful authorization, the plug-in device used to perform vehicle access and vehicle operations of the vehicle, the authentication keys enabling the portable device and the plug-in device to be paired for enabling vehicle access and operations;
   executing an authorization between the portable device carried by a user and a plug-in device coupled to the vehicle; and
   enabling access to vehicle operations in response to a successful authorization, wherein the enabling comprises:
   generating, by the portable device, a secure package, the secure package including an inner layer and an outer layer, the inner layer including the signed access key, the outer layer including a command request, the outer layer being signed by the portable device;
   transmitting the secure package from the portable device to the plug-in device;
   verifying, by the plug-in device, the signature of the portable device on the outer layer;
   verifying, by the plug-in device, the signature of the remote entity on the inner layer; and
   actuating, in response to verifying both the signature of the portable device and the signature of the remote entity and in response to determining that the command request is within the allowed operations, a respective vehicle operation associated with the command request.

2. The method of clam 1 further comprising the steps of performing an initial setup of the plug-in device in the vehicle, wherein performing the initial setup includes pairing the plug-in device as an additional keyfob to the vehicle.

3. The method of claim 2 wherein pairing the plug-in device as an additional keyfob to the vehicle further comprises the steps of:
   coupling the plug-in device to a service communication port of the vehicle;
   accessing a vehicle communication platform (VCP) of the vehicle;
   pairing the plug-in device to a passive entry/passive start system of the vehicle;
   requesting cryptography keys from a remote entity via the VCP for validation between the plug-in device and the passive entry/passive start system; and
   successfully pairing the plug-in device to the passive entry/passive start system for ongoing communication between the plug-in device and passive entry/passive start system.

4. The method of claim 1 further comprising sending a confirmation to the portable device.

5. The method of claim 1 wherein executing an authorization between the portable device carried by the user and the plug-in device further comprises:
   receiving, by the portable device, an interrogation signal transmitted by a communication node module of the vehicle;
   pairing the portable device and the communication node module of the vehicle;
   transmitting a notification, by the portable device, to the communication node module relating to a proximity of the portable device to the vehicle; and
   validating the portable device to a passive entry/passive start system of the vehicle utilizing an authorization key validation technique.

6. The method of claim 5 wherein the communication node module includes a Bluetooth low energy (BLE) module, and wherein the interrogation signal is transmitted as a BLE signal.

7. The method of claim 6 wherein receiving by the portable device the interrogation signal transmitted by the BLE module of the vehicle further comprises:
   monitoring a communication bus for communication over a predetermined period of time; and transmitting a wake-up call to a vehicle communication platform (VCP) in response to communication on the communication bus during the predetermined period of time; otherwise
entering sleep mode.

8. The method of claim 6 wherein validating the portable device to the passive entry/passive start system of the vehicle utilizing authorization key validation further comprises:
transmitting a wake-up call by the BLE module over a communication bus to a vehicle communication platform (VCP);
communicating a request for token validation to a remote entity via the VCP;
verifying, by the remote entity, a validity of the token;
transmitting a validation response to the portable device and the plug-in device;
transmitting an authorization key wirelessly from the portable device to the BLE module;
communicating the authorization key received by the BLE module to the plug-in device via the communication bus;
validating, by the plug-in device, the authorization key received from the portable device; and
communicating to the portable device an authorized pairing with the plug-in device.

9. The method of claim 8 wherein communicating a request for token validation to the remote entity via the VCP includes communicating a request for token validation from the portable device to the remote entity if a communication path from the VCP to the remote entity is not available.

10. The method of claim 8 wherein verifying by the remote entity that the token is still valid comprises the following steps:
determining by the remote entity of the validity of the token;
in response to determining the token is valid, determining whether a valid command request is being made by the portable device; and
transmitting a confirmation to the portable device that the command request is successfully received and authorized, otherwise, transmitting a failure message to the portable device in response to either token being invalid or the command request being invalid.

11. The method of claim 1 wherein enabling access to the vehicle and vehicle operations in response to a successful authorization further comprises:
actuating a command on the portable device relating to a vehicle operation;
transmitting the command from the portable device to a Bluetooth low energy (BLE) module;
receiving the command by the BLE module and communicating the command to the plug-in device;
transmitting, by the plug-in device, the command to a passive entry/passive start system; and
actuating the selected vehicle function in response to receiving the command.

12. The method of claim 11 wherein transmitting the command to the passive entry/passive start system comprises:
transmitting, by the plug-in device, a wake-up call on a communication bus to the passive entry/passive start system; and
transmitting the command on the communication bus to the passive entry/passive start system.

13. The method of claim 11 wherein the plug-in device further includes a keyfob printed circuit board for communicating indirectly with the passive entry/passive start system, wherein transmitting the command to the passive entry/passive start system further comprises:
communicating the command to the keyfob printed circuit board; and
transmitting the command to the passive entry/passive start system.

14. The method of claim 11 further comprising transmitting to the portable device a confirmation identifying execution of the command.

15. The method of claim 1 wherein executing the authorization between the portable device carried by the user and the plug-in device further comprises:
determining whether the command is a remote start operation;
validating the command by a remote entity;
communicating, by the remote entity, to a remote call service center the command for the remote start; and
executing, by the call service center, the remote start of the vehicle.

16. The method of claim 15 further comprising communicating an error to the portable device that the portable device needs to be closer to the vehicle in response to the command being other than a remote start operation.

17. The method of claim 11 wherein enabling access to the vehicle and vehicle operations in response to a successful authorization further comprises:
detecting the portable device within an interior of the vehicle by the BLE module in response to actuating the vehicle function;
supplying power to the plug-in device, wherein the plug-in device stores the authorization keys for enabling vehicle start functions;
detecting an actuation of a switch for ignition activation by the user within the vehicle; and
enabling an engine start operation of the vehicle.

18. The method of claim 1 further comprising:
detecting at least one of an end of trip selection by the user or a timed out period;
transmitting, by the plug-in device, a door lock command to a passive entry/passive start system;
actuating a vehicle door lock operation; and
deleting the authorization key from a memory of the plug-in device.

19. The method of claim 18 further comprising displaying a trip end message on the portable device.

20. A vehicle access system comprising:
a remote entity; and
a plug-in device coupled to a vehicle, the vehicle access system configured to:
generate a request reservation to reserve the vehicle via a portable device carried by a user, the reservation including a portable device identifier and reservation details;
transmit authentication keys to the portable device and the plug-in device coupled to the vehicle in response to a successful authorization, the plug-in device used to perform vehicle access and vehicle operations of the vehicle, the authentication keys enabling the portable device and the plug-in device to be paired for enabling vehicle access and operations;
generate, by the remote entity, a signed access key including a cleartext package of allowed operations, constraints, and the portable device identifier,
execute an authorization between the portable device carried by a user and a plug-in device coupled to the vehicle; and enable access to vehicle operations in response to a successful authorization including:
- generating, by the portable device, a secure package, the secure package including an inner layer and an outer layer, the inner layer including the signed access key, the outer layer including a command request, the outer layer being signed by the portable device;
- transmitting the secure package from the portable device to the plug-in device;
- verifying, by the plug-in device, the signature of the portable device on the outer layer;
- verifying, by the plug-in device, the signature of the remote entity on the inner layer; and
- actuating, in response to verifying both the signature of the portable device and the signature of the remote entity and in response to determining that the command request is within the allowed operations, a respective vehicle operation associated with the command request;

wherein the cleartext package is not readable by the portable device.

* * * * *